Dec. 11, 1956  C. E. HEMMINGER  2,773,808
TWO-STAGE FLUIDIZED HYDROFORMING
Filed May 29, 1953
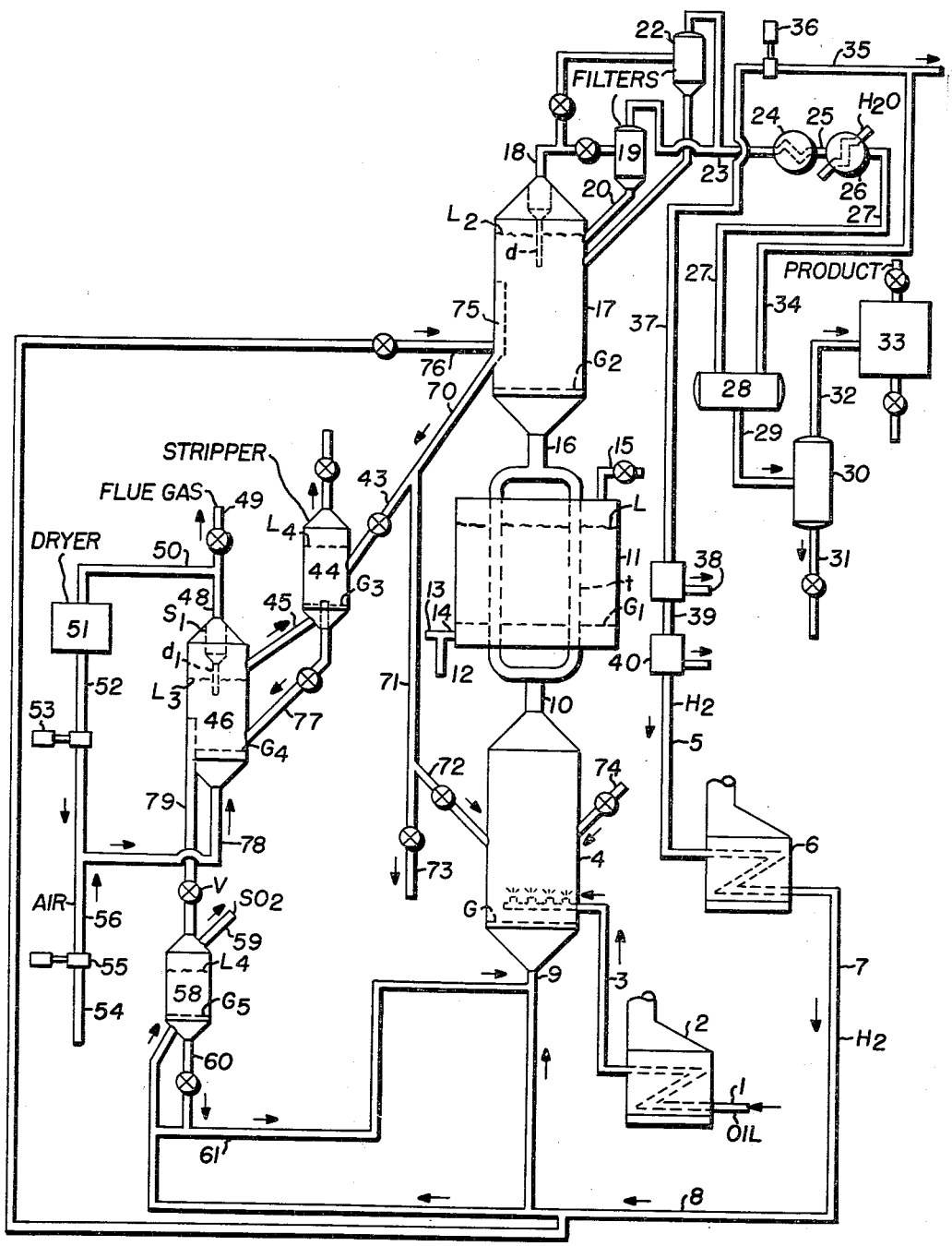
Charles E. Hemminger  Inventor
By J. Cashman  Attorney

# United States Patent Office 2,773,808
Patented Dec. 11, 1956

2,773,808

TWO STAGE FLUIDIZED HYDROFORMING

Charles E. Hemminger, Westfield, N. J., assignor to Esso Research and Engineering Company, a corporation of Delaware Application May 29, 1953, Serial No. 358,513

4 Claims. (Cl. 196—50)

The present invention relates to improvements in the hydroforming operation, more particularly, the present invention relates to improving the anti-detonation quality of naphtha by hydroforming in the presence of a fluidized bed of catalyst containing platinum group metal.

It is known that virgin naphthas containing naphthenes have been subjected to an operation called hydroforming in which the vaporized and heated naphtha is contacted with a fixed bed of platinum containing catalyst at elevated temperature and pressure in the presence of added hydrogen. During this treatment the naphthenes contained in the original naphtha are dehydrogenated to form the corresponding aromatics. There is also some aromatization of paraffins, such as where normal heptane is aromatized to form toluene. Further, some of the straight chain paraffins undergo isomerization to form branch chain paraffins of improved anti-detonation quality.

In the commercial practice of platinum catalyst hydroforming the naphtha is treated in stages, with reheating between stages. For example, the virgin naphtha is heated to a temperature of about 950° F. and then charged to the first of a series of separate reactors, each containing a fixed bed of the catalyst. Together with the naphtha feed there is charged to the reactor a hydrogen-containing gas also at a temperature as high as 1050° F. Because the reaction is very endothermic, a large temperature drop occurs during the passage of the reactants through the first reactor. This temperature drop may amount to as much as about 75–125° F. An effluent is withdrawn from the first reactor, reheated to a temperature as high as 950° F. and charged to the second reactor. During the passage of the reactants through this reactor, another temperature drop occurs which may amount to about 50–100° F. The effluent from the second reactor is passed through a suitable heating means and reheated to a temperature as high as 950° F. and passed through the third reactor.

The procedure indicated above has several defects. The most serious defect is that the feed to each reactor is altogether too hot while the temperature at the outlet is too low. The reactants charged to the reactor, because of their excessive temperature, cause the formation of inordinately large quantities of carbonaceous deposits and dry gas (i. e., $C_1$–$C_3$ hydrocarbons) while the temperature of the reactants passing through the final portion of the bed of catalyst at the discharge end is so low that very little, if any, reaction occurs in this region. Therefore, the process operates under optimum conditions only in the intermediate portions of the bed in the several reactors.

Another serious defect of the prior practice in using platinum catalyst for hydroforming is that it is necessary to operate at high gas pressures in the reaction zone, namely, pressures as high as 400 p. s. i. g. or higher. This is necessary in order to repress the rate of carbon formation so that the catalyst may be used for a reasonable period of time, say, at least six months without requiring replacement due to inactivation of the catalyst. When operating at pressures in the range indicated, the yield of high octane gasoline is repressed to an amount of at least 2–3% as compared with operations conducted at pressures in the range of 200–300 p. s. i. g.

The present invention embodies a method of so operating the hydroforming of naphthas in the presence of a platinum group metal catalyst that it corrects the insufficiencies of the prior practice.

In brief compass, the present invention involves the use of fluidized supported platinum or palladium catalyst beds disposed in at least two reactors separated by an intermediate catalyst reheating chamber and characterized in that the catalyst temperature at any point in the beds does not exceed 935° F., preferably, does not exceed 910° F. Furthermore, since a fluidized catalyst is employed, the temperature throughout the fluidized beds may be maintained substantially constant at the foregoing values.

The main object of the present invention, therefore, is to provide an improved hydroforming operation which enables carrying out the operation under conditions such that the degradation of the feed to form carbonaceous deposits and dry gas is minimized.

Another object of the present invention is to carry out the hydroforming operation at substantially lower pressures than is current or prior practice, which results in the capability of the process to produce larger yields of product of the same anti-detonation quality as attained in prior practice.

Another object of the present invention is to so operate the hydroforming of naphthas as to permit the use of a much smaller amount of recycle gas, in other words, gas containing hydrogen.

Another object of the present invention is to provide a hydroforming operation adapted to process stocks containing substantial amounts of sulfur-containing material under conditions such that the platinum catalyst is not deactivated by said sulfur.

Other and further objects of the present invention will appear from the following more detailed description and claims.

In the accompanying drawing there is shown, digrammatically, an apparatus layout in which a preferred modification of the present invention may be carried into effect.

Referring in detail to the drawing, a feed oil comprising, say, a virgin naphtha boiling substantially within the range of from about 200°–375° F. and containing, say, from 25–50% naphthenes enters the present system through line 1 and thence is charged to a suitable heating means 2, which may comprise a furnace wherein it is heated to a temperature of about 1000° F. The heated oil vapors are withdrawn from the heating means 2 through line 3 and charged into the lower portion of a first reaction zone 4 which contains powdered platinum-containing catalyst further identified hereinafter. Simultaneously, "recycle" gas, that is to say, a gas containing hydrogen in amounts from about 80–90%, which gas is recovered from the product purification system, as hereinafter explained, is passed from line 5 through a suitable heating means 6 wherein it is heated to a temperature of about 1100° F., thence withdrawn through line 7 and passed via lines 8 and 9 into the bottom of reactor 4 where it mixes with the catalyst and the heated oil vapors. The reactor 4 is provided with gas distributing means G, which may be any suitable means such as a grid or screen. In the reactor 4, which is of the upflow type, catalyst and gasiform material flow concurrently upwardly, and the desired hydroforming reaction occurs. The superficial velocity of the gasiform material in reactor 4 is of the order of ½ to 1 foot per second. By superficial velocity one means the velocity of the gasiform material were there no catalyst in the reactor. Under the flow conditions indicated, the catalyst forms a dense fluidized bed which substantially fills the reactor. The catalyst and gasiform material pass from reactor 4 through a pipe 10 into a reheating case or vessel 11. Heat may be supplied to heater 11 by any convenient means. However, a good way to add heat to the mixture of catalyst and gasiform material is to cause the mixture to flow through a plurality of tubes $t$ which may be about 3" or 4" in diameter, which tubes are immersed in a fluidized bed of powdered inert heat retention material which would extend from a grid $G_1$ to an upper dense phase level L. A mixture of fuel from line 12 and air from line 13 is formed in line 14, and this mixture is charged to heater 11 below the grid $G_1$ and passes upwardly therethrough into the fluidized bed of said powdered heat retention material at a superficial velocity of about ½ to 1½ feet per second, thus forming the fluidized bed. The mixing and agitated state of the fluidized bed of said powdered material in the said fluidized bed scours the outer surfaces of the tubes so that excellent heat transfer co-efficients are obtained between the fluidized bed of heat retention material surrounding the tubes and the catalyst and reactants within the tubes.

The combustion of the fuel in the fluidized bed of heat retention material, which material may be ground sand, mullite etc., of course, adds heat to the said bed which is transferred to the catalyst material within the tubes $t$. The combustion fumes are withdrawn from heater 11 through an outlet pipe 15. The materials in tubes $t$ are withdrawn therefrom through pipe 16 and charged into a second reactor 17. This reactor is also provided with a gas distributing means $G_2$, which may be of the same type as G or $G_1$ previously mentioned. The catalyst in reactor 17 is formed into a dense fluidized bed extending from $G_2$ to $L_1$. Under conditions more fully set forth hereinafter, the reaction is completed in reactor 17 and the crude product is withdrawn overhead through line 18. Prior to withdrawal of the crude product from 17, the same is forced through one or more cyclones S wherein entrained catalyst is separated from the material about to be withdrawn from the reactor and returned to the dense bed through one or more dip pipes $d$.

Because the gasiform material in line 18 may still contain the expensive catalyst entrained therein, it is forced through a filter 19 to separate the last traces of such catalyst and to return it to reactor 17 through line 20. This catalyst on the filter 19 is removed by periodically discontinuing the flow of oil vapors to said filter and then causing any suitable inert gas to flow through the filter in a direction opposite that of the flow of the oil vapors and gas through the filter when the latter are on stream. This method of cleaning the filter is well known in the chemical arts, and does not constitute a feature of the present invention. A second filter 22 operates in parallel with filter 19, and it is placed onstream to filter out catalyst from the crude product while filter 19 is offstream and being treated with a blowback gas to remove catalyst therefrom for return to reactor 17. Eventually, the gasiform material is withdrawn from the filter 19 or 22 via line 23 and passed to heat exchanger 24 wherein it may be heat exchanged with either cold oil feed or recycle gas. From heat exchanger 24 the crude product is passed via line 25 to a cooler 26 wherein it is cooled to a temperature of about 100° F. The cooled product is withdrawn from cooler 26 through line 27 and passed to a separator 28. A liquid product is withdrawn from separator 28 through line 29 and passed to a fractional distillation column 30. From fractional distillation column 30 a bottoms fraction, possibly containing traces of catalyst, is withdrawn through line 31 and filtered in suitable equipment (not shown) to recover said catalyst. The overhead product from distillation column 30 is withdrawn through line 32 and this may be delivered to a storage 33.

Referring again to separator 28, gasiform material comprising the recycle gas previously mentioned is withdrawn therefrom through line 34 and thence recirculated to furnace 6 via line 35, compressor 36, line 37 and to a Girbitol treater wherein the hydrogen gas is treated with an aqueous solution of ethanolamine at conventional operating conditions to remove sulfur bodies which may be rejected from the system through line 38. The hydrogen-containing gas substantially free of sulfur is then passed via line 39 through a bed of alumina in 40, which alumina serves to remove water, thence withdrawn through line 5 and processed as previously described. The scrubbing and drying may be omitted for very low sulfur content feeds.

Referring again to reactor 17, the catalyst therein contained may be recirculated to reactor 4 as follows:

The catalyst is withdrawn from reactor 17 through line 70, thence passed via lines 71 and 72 into reactor 4. Spent catalyst may be withdrawn from the system through line 73 and reworked to recover the platinum or reactivated by known chemical means. Fresh, reworked or reactivated catalyst may be added to the reactor through line 74.

The catalyst in reactors 4 and 17 and in the system generally has 0.1 to 0.6 wt. percent platinum or 0.3 to 1.5 wt. percent palladium impregnated on an alumina base. The impregnation of the alumina is done by treating the alumina with an aqueous solution of a platinum salt such as chloroplatinic acid, with subsequent drying at about 600° F. before being introduced to the reactor.

The alumina base is essentially chemically pure with the exception that 0.1 to 2.8 wt. percent silica may be incorporated with the alumina during precipitation of the alumina. The alumina may be prepared by several methods, as by the hydrolysis of an aluminum alcoholate, by precipitation from an aqueous sodium aluminate solution, by adding an acid, or by precipitation from an aluminum chloride aqueous solution by adding a basic material such as ammonia. The former method is preferred. The particle size is in the range of 20 to 100 microns with not over 5% of material smaller or larger than this range.

Although the present process greatly retards the formation of carbonaceous and other poisoning contaminants on the catalyst, nevertheless, provision is made according to the present invention for removal of such contaminants as are unavoidably formed on the said catalyst. Toward this end, catalyst is withdrawn from reactor 17 through stripper standpipe 75, where recycle hydrogen gas in line 76 fed to said stripper removes occluded hydrocarbons. Hydrogen gas in line 76 is derived from line 8. The catalyst in recycle gas stripper 75 is withdrawn via 70 and 43 and charged into a flue gas stripping zone 44, wherein it is treated with flue gas fed thereto through line 45. This purging gas in line 45 is a portion of the flue gas obtained in a subsequent catalyst regeneration step, as will be more fully explained hereinafter. The velocity of the gasiform material in 44 is controlled so as to provide a fluidized bed of catalyst with an upper dense phase level $L_4$ in the same manner as that previously described in connection with the reactors 4 and 17. As usual, the stripping zone in 44 is provided with a gas distributing means $G_3$. The purpose of the stripping treatment is to remove occluded and adsorbed hydrogen. The stripped catalyst is withdrawn from stripping zone 44 through line 77 and charged to a regenerator 46, where, again, it is formed in a fluidized bed by an upflowing oxygen-containing regeneration gas which is charged to the regenerator through line 78, thence passes upwardly through a grid $G_4$ and then into contact with the catalyst to form a fluidized bed. The fluidized bed extends from $G_4$ to an upper dense phase level $L_3$.

The oxygen-containing gas, which may be undiluted air, converts the carbonaceous deposits on the catalyst into regeneration fumes which are withdrawn after being forced through one or more cyclones $S_1$ wherein entrained catalyst is separated and returned to the dense bed through one or more dip pipes $d_1$. The regeneration fumes are withdrawn from the regenerator through line 48 and may be rejected from the system through line 49. However, a portion of these regeneration fumes will be passed via line 50 through a dryer 51 containing a fluidized bed of alumina to remove water, thence withdrawn through line 52, forced through compressor 53 and thence mixed with the air in line 47 to dilute the same to form a regeneration gas containing from about 2 to 5% oxygen. The air employed in the regeneration system enters through line 54, is thence forced through compressor 55 and thence passed via line 56 into line 78. Vessel 51 may operate as a combination dryer and $SO_2$ remover. In vessel 51 the bed contains both alumina and lime ($Ca(OH)_2$), or caustic (NaOH). The alumina removes water and the lime or caustic removes $SO_2$. In some cases two successive vessels may be employed for this purpose.

Referring again to the catalyst in regenerator 46, the same may be withdrawn through a standpipe 79 provided with a flow control V and also with gas taps (not shown) for injection of a fluidizing gas, and charged to a treater 58 wherein it is treated with recycle gas from line 8. In treating vessel 58 which is provided with a gas distributing means $G_5$, the catalyst is formed into a dense fluidized bed by controlling the superficial velocity of the gasiform material flowing therethrough as previously described, which dense fluidized bed has an upper level at $L_5$. The hydrogen-containing gas in 58 removes residual $SO_2$ and $SO_3$ from the catalyst and also occluded flue gases or combustion fumes. The treating gas containing the removed material is withdrawn through line 59. The gasiform material in this line is passed through filters, such as 19 and 22, to remove catalyst before the said treating gas is rejected from the system. The treated catalyst is withdrawn from treater 58 through line 60 and charged to a stream of recycled gas in line 61 and returned to reactor 4 via line 9.

The operating conditions in the above described process are set forth below:

|  | Normal | Preferred |
|---|---|---|
| Pressure, p. s. i. g | 100–500 | 200–300 |
| Temperature, T °F | 850–950 | 880–910 |
| Temperature increase from reactor 4 to 17, °F | 0–50 | 10–20 |
| Space velocity, W./Hr./W.[1] | 1–15 | 2–5 |
| Wt. ratio catalyst, reactor 4/reactor 17 | 0.5–3 | 0.8–1.5 |
| Recycle gas, MCF./bbl. feed | 3–10 | 5–7 |

[1] Lbs. of liquid feed per hour per lb. catalyst in reactors.

Operating ranges for the various auxiliary portions of the apparatus are tabulated below:

|  | Heater 11 | Dryer and $SO_2$ Adsorber 51 |
|---|---|---|
| Pressure, p. s. i. g | Atmospheric | System pressure. |
| Temperature, T °F | 1,000–1,300° F | 50–150° F |
| Velocity, Ft./sec | 0.5–1.5 | 1–5 |

|  | Stripper 44 | Regenerator 46 | Treater 58 |
|---|---|---|---|
| Pressure, p. s. i. g | System | System | System. |
| Temp., T. °F | As reactor 17 | 800–1,000° F | As regenerator 46. |
| Velocity, Ft./Sec | 0.2–0.5 | 0.3–1.0 | 0.2–0.5 |
| Catalyst Contact Time, Minutes | 1–20 | 3–40 | 1–20 |

Typical results for processing a high sulfur mixed West Texas and coastal naphtha of 200°–350° F. boiling range and containing 45% naphthenes, 15% aromatics and 40% paraffins are given below:

|  | Feed | Product |
|---|---|---|
| Research O. N | 55 | 90 |
| Sulfur, wt. percent | .15 | .0001 |
| R. V. P. Lbs. p. s. i | 0.5 | 1.5 |
| Vol. percent, $C_5+$ | 100 | 90 |
| Vol. percent, $C_4$ | 0 | 4 |

To recapitulate, the invention sets forth the following advantages over the old fixed bed method of hydroforming.

(a) The reactors are each at constant temperature, so-called isothermal conditions, so that no excessively high temperatures are present to degrade the feed stocks.

(b) Heat may be added to the catalyst and vapor mixture. High feed and gas temperatures are avoided. Catalyst can be used to maximum efficiency by eliminating low temperature zones. High degrees of conversion are thus possible.

(c) The second reactor, 17, can be at a higher temperature than the first one, 4, without degrading the sensitive $C_5$ ring naphthenes which are in high concentration in the feed. The products from reactor 4 are reacted to completion at the higher temperature in the second reactor.

(d) Low surface combustion temperatures in the regenerator are attained by the low $O_2$ concentration and the removal of adsorbed hydrogen on the catalyst in stripper 44.

(e) Catalyst regeneration is accomplished in very low concentrations of water, less than 1.0 mol percent, because of the absence of hydrogen on the catalyst and the drying of the recycle flue gas in vessel 51.

(f) Catalyst may be regenerated with minimum formation of sulfate radical on the catalyst, which sulfur bodies may cause permanent deactivation of the catalyst. This is accomplished by removal of $SO_2$ from the recycled diluent flue gas.

(g) Residual sulfate radical on catalyst is removed by hydrogen treat after regeneration of the catalyst.

Many modifications of the invention described herein may be made by those familiar with the present art without departing from the spirit thereof.

What is claimed is:

1. In the hydroforming of naphthas, the improvement which comprises providing a first reaction zone containing a bed of fluidized platinum-containing catalyst having an average particle size suitable for fluidization, maintaining hydroforming conditions of temperature and pressure in said reaction zone, withdrawing the catalyst and gasiform material from the said first reaction zone, passing them through a reheating zone whereby they are heated to a temperature above that prevailing in the first reaction zone, thereafter passing the reheated materials to a second reaction zone maintained at a temperature higher than that in the first reaction zone, causing the catalyst in the said second reaction zone to form a well-fluidized bed, permitting the reactants to remain resident in the said second reaction zone for a sufficient period of time to effect the desired hydroforming reaction, withdrawing reaction vapors overhead from said second reaction zone, cooling the said reaction vapors to condense normally liquid constituents thereof, thereafter conducting the cooled product to a separation zone, withdrawing from said separation zone normally gaseous material containing recycle hydrogen gas, treating the said recycle hydrogen gas with an aqueous alkaline solution to remove sulfur-containing material, thereafter treating the hydrogen-containing gas to remove water, and recycling the treated hydrogen after suitable reheating to the first reaction zone, and recovering a hydroformed product of improved octane quality from said process.

2. The process of claim 1, in which the amount of catalyst in the said second named reaction zone is greater than the amount of catalyst in the first named reaction zone.

3. The method set forth in claim 2, in which both of said reaction zones are maintained at substantially isothermal conditions.

4. The method set forth in claim 1, in which the pressure in both of said reaction zones is in the range of from about 200 to 300 pounds per square inch.

References Cited in the file of this patent

UNITED STATES PATENTS

| | | |
|---|---|---|
| 2,406,112 | Schulze | Aug. 20, 1946 |
| 2,602,771 | Munday et al. | July 8, 1952 |
| 2,642,381 | Dickinson | June 16, 1953 |
| 2,654,694 | Berger et al. | Oct. 3, 1953 |
| 2,674,612 | Murphree | Apr. 6, 1954 |

FOREIGN PATENTS

| | | |
|---|---|---|
| 587,774 | Great Britain | May 6, 1947 |